(12) United States Patent
Ikarashi et al.

(10) Patent No.: US 10,730,153 B2
(45) Date of Patent: Aug. 4, 2020

(54) ATTACHING DEVICE

(71) Applicant: Yorozu Corporation, Yokohama (JP)

(72) Inventors: Misao Ikarashi, Yokohama (JP);
Hidenori Momose, Yokohama (JP);
Jyunichi Sato, Yokohama (JP)

(73) Assignee: Yorozu Corporation, Yokohama (JP)

( * ) Notice: Subject to any disclaimer, the term of this patent is extended or adjusted under 35 U.S.C. 154(b) by 106 days.

(21) Appl. No.: 15/515,052

(22) PCT Filed: Sep. 29, 2014

(86) PCT No.: PCT/JP2014/075941
§ 371 (c)(1),
(2) Date: Mar. 28, 2017

(87) PCT Pub. No.: WO2016/051474
PCT Pub. Date: Apr. 7, 2016

(65) Prior Publication Data
US 2017/0209967 A1    Jul. 27, 2017

(51) Int. Cl.
*B23P 19/04* (2006.01)
*B23P 19/06* (2006.01)
(Continued)

(52) U.S. Cl.
CPC ............. *B23P 19/04* (2013.01); *B23K 3/00* (2013.01); *B23K 11/30* (2013.01); *B23P 19/06* (2013.01); *B23P 21/00* (2013.01)

(58) Field of Classification Search
CPC ........... B23P 19/04; B23P 19/06; B23P 21/00; B23K 11/30; B23K 3/00
See application file for complete search history.

(56) References Cited

U.S. PATENT DOCUMENTS

| 2,905,803 A | 9/1959 | Brady, Jr. |
| 6,163,004 A | 12/2000 | Aoyama et al. |
| 2007/0295745 A1 | 12/2007 | Yoshitaka et al. |

FOREIGN PATENT DOCUMENTS

| CN | 101879651 A | 11/2010 |
| CN | 201769198 U | 3/2011 |

(Continued)

OTHER PUBLICATIONS

Machine Translation for Sekiguchi, JP-2004034232-A (Year: 2004).*

(Continued)

*Primary Examiner* — David P Bryant
*Assistant Examiner* — Christine Bersabal
(74) *Attorney, Agent, or Firm* — Faegre Drinker Biddle & Reath LLP

(57) ABSTRACT

Provided is an attaching device that can convey a component, such as a nut, to a portion to be welded without using an air cylinder.

The present invention provides an attaching device (100) that attaches a nut (240) to a bracket (230). The attaching device (100) has a component feeding part (10) that stores the nut therein, a welding part (40) that welds the nut to the bracket by using electrodes (41, 42), a conveying part (20) that conveys the nut stored in the component feeding part to a position where the nut is to be attached to the bracket, and a feeding head (30) that temporarily positioned between the electrodes (41, 42) and that places the nut conveyed from the conveying part on the lower electrode of the pair of electrodes.

3 Claims, 7 Drawing Sheets

(51) Int. Cl.
*B23P 21/00* (2006.01)
*B23K 3/00* (2006.01)
*B23K 11/30* (2006.01)

(56) References Cited

FOREIGN PATENT DOCUMENTS

| JP | S577826 B2 | | 2/1982 |
|---|---|---|---|
| JP | 60-007984 U | | 1/1985 |
| JP | 61235082 A | * | 10/1986 |
| JP | H0529638 U | | 4/1993 |
| JP | H07314147 A | | 12/1995 |
| JP | H09239554 A | | 9/1997 |
| JP | 2000343233 A | | 12/2000 |
| JP | 2004034232 A | * | 2/2004 |
| JP | 2007218288 A | * | 8/2007 |
| JP | 4038403 B2 | | 1/2008 |
| RU | 2027576 C1 | | 1/1995 |
| RU | 2381883 C2 | | 2/2010 |
| RU | 2507051 C2 | | 2/2014 |
| WO | WO-9806530 A1 | | 2/1998 |

OTHER PUBLICATIONS

Machine Translation for Nakamura, JP-61235082-A (Year: 1986).*
Machine Translation for Nemoto, JP-2007218288-A (Year: 2007).*
International Preliminary Report on Patentability with English Translation for International Application No. PCT/JP2014/075941, dated Apr. 13, 2017.
Chinese Office Action with English Translation for Chinese Application No. 201480082278.6, dated Jul. 30, 2018.
International Search Report for PCT/JP2014/075941 dated Nov. 25, 2014.
Written Opinion of the International Searching Authority for PCT/JP2014/075941 dated Nov. 25, 2014.
Extended European Search Report for Application No. 14903188.2, dated Oct. 13, 2017.
Russian Office Action with English Translation of Russian Application No. 2017110253/02(018043), dated Nov. 22, 2018.
Japanese Office Action with English Translation for Japanese Application No. 2017-7008657, dated Feb. 21, 2019.

* cited by examiner

ATTACHING DEVICE

CROSS-REFERENCE TO RELATED APPLICATIONS

This application is a national stage application (under 35 U.S.C. § 371) of PCT/JP2014/075941, filed Sep. 29, 2014, which is incorporated herein by reference in its entirety.

TECHNICAL FIELD

The present invention relates to an attaching device.

BACKGROUND ART

Many brackets for connecting suspension links, stabilizer bars or harnesses and the like are attached to a sub-frame of a suspension, and connection by fastening using fastening parts such as bolts and nuts is made. After the nuts are welded to the sub-frame in advance at each connection part, only bolts are installed with a wrench, and use of such a method achieves excellent work efficiency. In the case where the nut is welded to the sub-frame, a so-called projection nut having a projection on the nut seating surface is employed, and measures of attaching the nut to a bracket seating surface of the sub-frame by projection welding are often used.

In general, a conventional apparatus used for welding the nut to a counterpart component with projection includes a feeder for feeding a nut, a component feeding part, an upper electrode, and a lower electrode (refer to Patent Literature 1).

CITATION LIST

Patent Literature

Patent Literature 1: JP 4038403 B1

SUMMARY OF INVENTION

Technical Problem

In the component feeding device of Patent Literature 1, an air cylinder is provided at the tip of a hose that feeds a nut from a feeder, and nuts are stored in front of an air cylinder, and nuts are singly transported to the electrode for welding by stroke movement of a rod constituting the air cylinder. However, since the rod of the air cylinder linearly moves by stroke, the device becomes bulky by the rod. When considering installing the component feeding device at a factory overseas from the viewpoint of cost reduction and the like, it is sometimes difficult to ensure a relatively large space for the factory according to lodgments. For this reason, it is probable that compactness of the component feeding device is required.

Then, the present invention is made in order to solve the above problem, and an object of the present invention is to provide an attaching device which accomplishes space saving.

Solution to Problem

In order to achieve the above object, an attaching device for attaching a nut to a counterpart component according to the present invention includes a storage part storing a plurality of the nuts, a welding part welding the nut to the counterpart component by a pair of electrodes, a conveying part having a flexible long member for conveying the nut stored in the storage part singly to the welding part, and a placement part provided at an outlet of the long member on a side of the welding part, and temporarily getting close between the pair of electrodes of the welding part to place the nut. The nut is placed on a lower electrode of the pair of electrodes after passing through the placement part singly from the conveying part.

Advantageous Effect of Invention

According to the attaching device of the present invention, the conveying part conveys the nuts singly to the welding part, and the nuts pass through the placement part singly to be placed at the lower electrode of the pair of electrodes. Therefore, it is possible to dispense with a conventional configuration of an air cylinder for storing and delivering nuts and a rod attached thereto, thereby accomplishing space saving.

DESCRIPTION OF EMBODIMENTS

Figure 1:
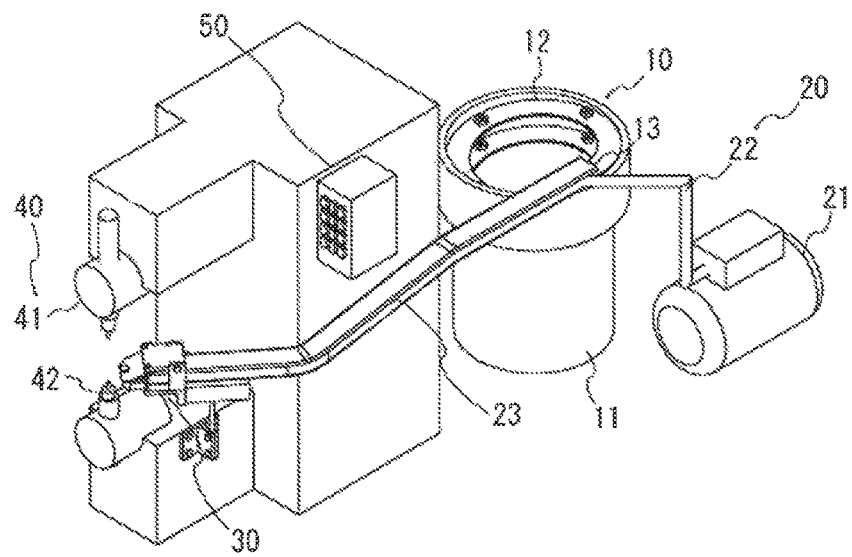
FIG. 1 is a perspective view of an attaching device according to a first embodiment of the present invention.

Hereinafter, embodiments of the present invention will be described with reference to the accompanying drawings. The technical scope disclosed in the claims, and the definitions of terms, are not limited to the disclosure hereinbelow. In some cases, the proportions of dimensions in the drawings differ from actual proportions, having been exaggerated for convenience in description.

Figure 2:
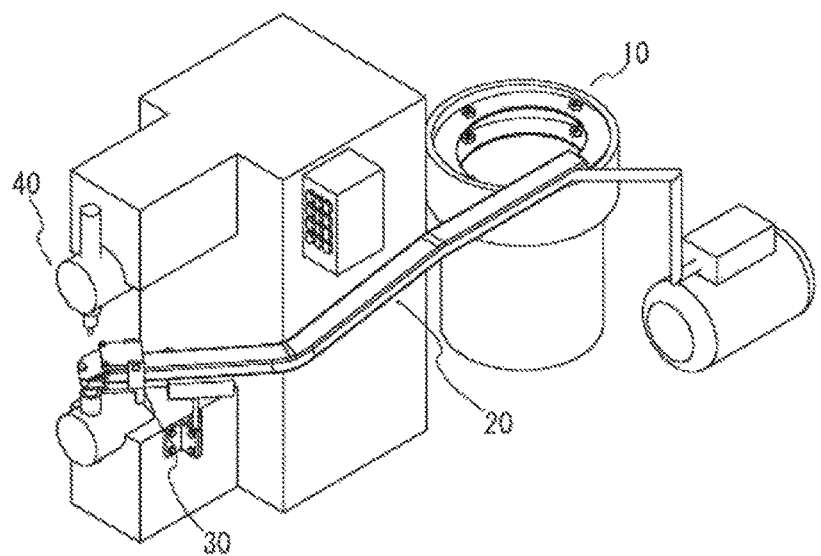
FIG. 2 is a perspective view of the attaching device showing a state different from that in FIG. 1.
Figure 3:
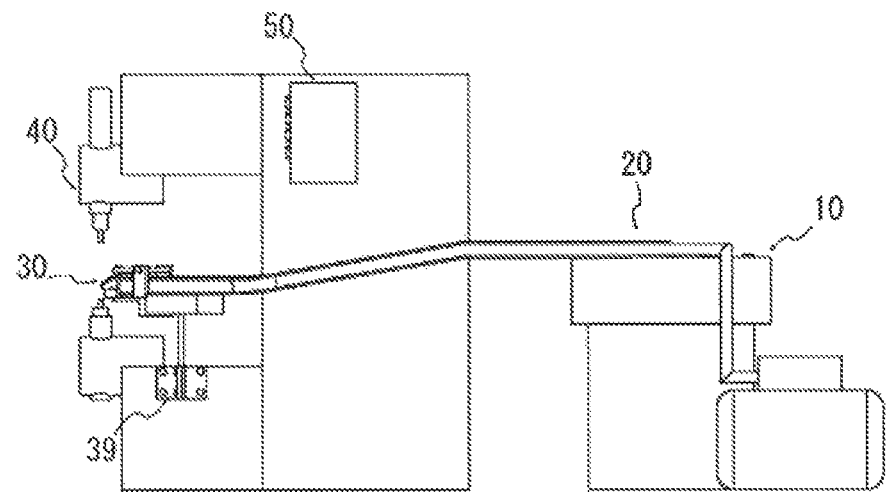
FIG. 3 is a side view of the attaching device.
Figure 4:
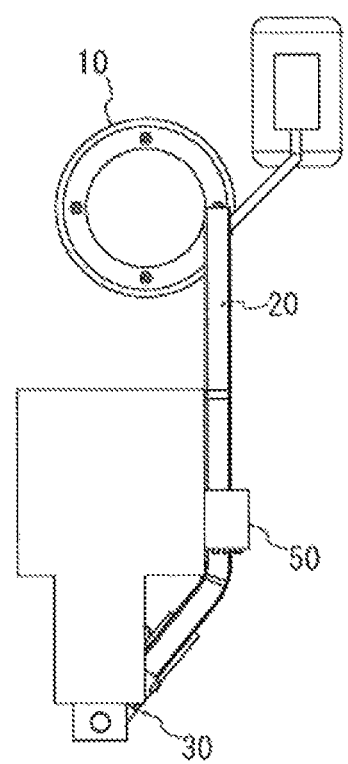
FIG. 4 is a plan view of the attaching device.
Figure 5:
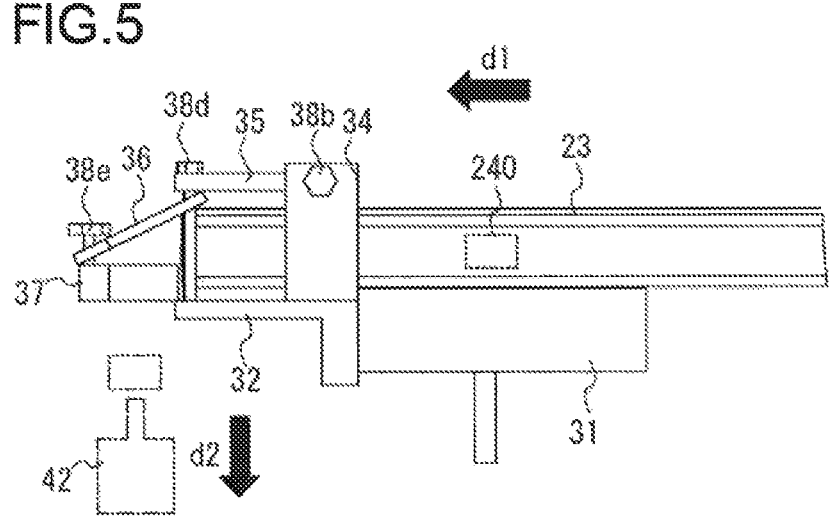
FIG. 5 is a side view of a placement part of the attaching device.
Figure 6:
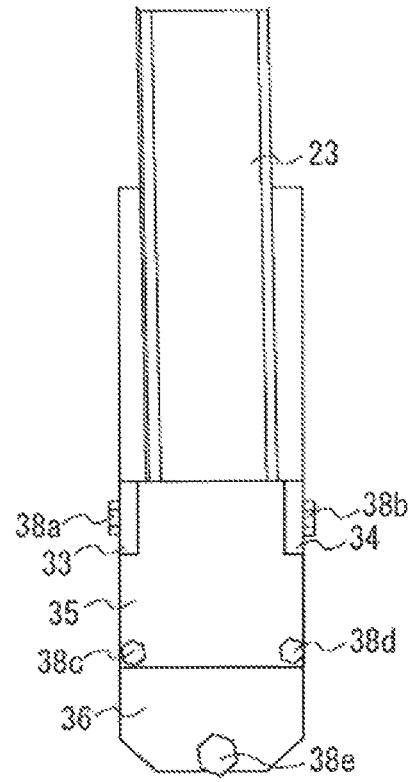
FIG. 6 is a plan view of the placement part.
Figure 7A:
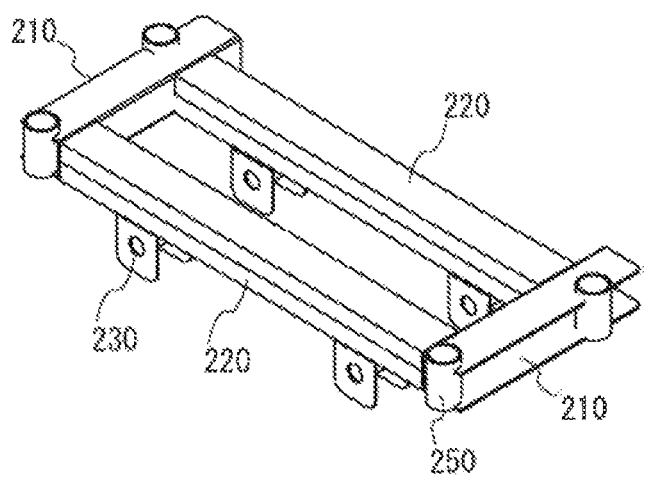
FIG. 7(A) is a perspective view of a sub-frame of a suspension.
Figure 7B:
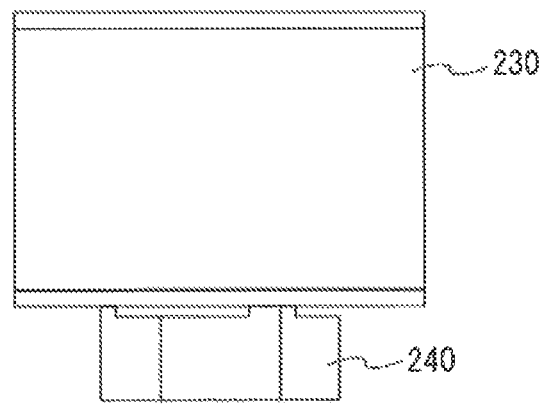
FIG. 7(B) is a view showing a state where a welding nut is joined to a component.
Figure 7C:
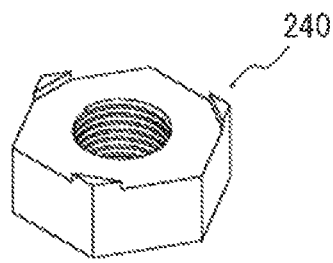
FIG. 7(C) is a perspective view of a welding nut.

FIG. 1 is a perspective view of an attaching device according to a first embodiment of the present invention. FIG. 2 is a perspective view of the attaching device showing a state different from that in FIG. 1. FIGS. 3 and 4 are a side view and a plan view of the attaching device respectively. FIG. 5 is a side view of a placement part of the attaching device. FIG. 6 is a plan view of the placement part. FIG. 7(A) is a perspective view of a sub-frame of a suspension. FIG. 7(B) is a view showing a state where a welding nut is joined to a component. FIG. 7(C) is a perspective view of a welding nut.

(Example in Which a Component to be Attached is Used)

The attaching device 100 according to this embodiment is provided when a nut 240 is joined to a bracket 230 for connecting components such as a suspension link in a sub-frame 200 of a suspension as shown in FIG. 7(A), for example. Generally, the sub-frame 200 of the suspension includes a side member 210, a cross member 220, a bracket 230, a nut 240, and a collar 250. The bracket 230 is joined to the cross member 220. The nut 240, which is called a welding nut, is attached to the bracket 230 by welding.

(Attaching Device)

Next, the attaching device according to this embodiment will be described. The attaching device 100 includes a component feeding part 10 (corresponding to a storage part), a conveying part 20, a feeding head 30 (corresponding to a placement part), a welding part 40, and an operation part 50.

The component feeding part 10 includes a vibration part 11, a nut feeding port (not shown), a helical passage 12, and a delivery portion 13. The component feeding part 10 has a columnar outer shape, and the vibration part 11 is constituted by a motor or the like that generates vibration at the lower portion of the component feeding part 10. The nut feeding port is provided at the lower part of the component feeding part 10, and the helical passage 12 is formed to extend spirally upward from the nut feeding port. The helical passage 12 includes a slightly inclined helical passage toward the center when viewed in plan, and further includes a projection on the inner peripheral edge portion of the helical passage 12. As a result, among the welding nuts, a welding nut whose protrusion is not placed in the downward direction in the helical passage is sifted from the helical passage 12, so that the direction of protrusions of the welding nuts can be aligned.

The delivery portion 13 is located at an upper terminal of the helical passage 12, and is connected to the conveying part 20. The nut 240 thrown from the nut feeding port is vibrated by the vibration part 11, thereby moves helically from the lower side to the upper side of the helical passage 12, and is delivered to the delivery portion 13.

The conveying part 20 includes an air pressure supply part 21, an air supply path 22, a nut conveying path 23 (corresponding to a long member), and a detection part. Although the air pressure supply part 21 is constituted by a compressor in the present embodiment, the air pressure supply part 21 need not be a compressor as long as air pressure for conveying the nut 240 can be supplied. The air supply path 22 is provided slightly downstream of the delivery portion 13 in the nut conveying path 23 and supplies compressed air from the air pressure supply part 21 to the nut 240 which is delivered from the component feeding part 10. As a result, the nut 240 is delivered to the welding part 40. In addition, in the present embodiment, the detection part includes a sensor at the delivery portion 13, whereby the nut 240 is singly sent from the delivery portion 13.

The nut conveying path 23 is a long member formed in a substantially rectangular and hollow cross section. The end of the nut conveying path 23 is located at the delivery portion 13 which is located at an upper end of the helical passage 12. The nut conveying path 23 supplies compressed air from the air pressure supply part 21 to the nut 240, which moves from the vibration part 11, via the air supply path 22. The air supply path 22 and the nut conveying path 23 are constituted by hoses, and their material is made of a flexible resin material or the like, but the material is not limited to a flexible resin. While the nut conveying path 23 has a curved portion, the nut conveying path 23 is configured to extend generally in a horizontal direction intersecting the vertical direction in which the electrodes 41 and 42 are aligned.

The feeding head 30 is provided at an end portion of the nut conveying path 23 which is opposite to the delivery portion 13. The feeding head 30 directs the nut 240 delivered from the delivery portion 13 of the nut conveying path 23 toward the welding part 40. As shown in FIGS. 5 and 6, the feeding head 30 includes a driving part 31, a movable base 32 (corresponding to a moving part), fixing parts 33, 34, and 35, regulation parts 36 and 37 (corresponding to a direction changing part), and bolts 38*a*, 38*b*, 38*c*, 38*d*, and 38*e*.

The driving part 31 as well as the bracket 39 is fixed to the side surface of a housing of the welding part 40 by bolts, and is configured as an electric cylinder. However, the driving part 31 is not limited to the electric cylinder. The movable base 32 is translatably connected to the driving part 31, and the nut conveying path 23 is fixed to the movable base 32 by the fixing parts 33, 34, and 35 and the bolts 38*a*, 38*b*, 38*c*, and 38*d*. Since the movable base 32 and the nut conveying path 23 are movably attached to the driving part 31, the nut conveying path 23 as well as the movable base 32 is configured to be translatable, and can move between a position away from the welding part 40, as shown in FIG. 1, and a position between the electrodes 41 and 42 of the welding part 40 as shown in FIG. 2. The movable base 32 is translatably configured to move in a substantially horizontal direction which intersects the vertical direction in which the electrodes 41 and 42 are aligned.

The fixing parts 33 and 34 are formed by plate-like members attached to the movable base 32 and disposed on the side of the nut conveying path 23 and extending in a substantially vertical direction. The fixing part 35 is a plate-like member sandwiched by the fixing part 33 and the fixing part 34, and fastened to the fixing parts 33 and 34 by the bolts 38*a* and 38*b*. The fixing part 35 together with the movable base 32 sandwiches and fixes the nut conveying path 23 in the vertical direction.

The regulation part 36 is a plate-like member that is attached to the fixing part 35 and the regulation part 37 and regulates the moving direction of the nut 240 sent from the nut conveying path 23. The outlet of the nut conveying path 23 is located in the vicinity of the regulation part 36. The regulation part 36 is attached to the fixing part 35 by bolts 38*c* and 38*d*, and is attached to the regulation part 37 by the bolt 38*e*. As shown in FIG. 5, the regulation part 36 is attached to the fixing part 35 and the regulation part 37 so as to be inclined with respect to the vertical direction. The degree of inclination of the regulation part 36 is adjusted by the degree of tightening of the bolt 38*e* with respect to the regulation part 37.

The regulation part 37 together with the regulation part 36 delivers downward the nut 240 sent from the conveying part 20. The regulation part 37 is a plate-like member configured such that the outer shape of its lower side in FIG. 6 is substantially the same shape as that of the regulation part 36 in the plane view, and further the passage of the nut 240 is cut out in a recess shape. Although the end of the regulation part 37 is connected to the movable base 32 by welding, the end of the regulation part 37 may be configured to be attached to the movable base 32 by bolts.

The welding part 40 has an upper electrode 41 and a lower electrode 42. The lower electrode 42 is provided with a pin for positioning the welding nut 240. During welding, the welding nut 240 is positioned at the pin of the lower electrode 42, and the upper electrode 41 and the lower electrode 42 are energized, whereby the welding nut 240 and a member such as the bracket 230 are joined. The electrodes 41 and 42 are arranged along with each other in a substantially vertical direction. The operation part 50 is provided to control operations of the component feeding part 10, the conveying part 20, the feeding head 30, the welding part 40, and the like, and performs various operations by button operations. Since the configuration of the operation part 50 is the same as the conventional configuration, the description will be omitted.

(Attachment of Nut)

Attachment of the nut 240 by the attaching device 100 is performed as follows. First, when the vibration part 11 generates vibrations in a state where the nut 240 is supplied to the component feeding part 10, the nut 240 placed in the helical passage 12 moves upward through the helical passage 12 to reach the delivery portion 13. The nut 240 that has reached the delivery portion 13 receives compressed air supplied from the air supply path 22 and is singly sent inside the nut conveying path 23 toward the welding part 40.

On the other hand, the feeding head 30 temporarily gets close between the electrode 41 and the electrode 42 before the nut 240 is delivered from the delivery portion 13 as shown in FIG. 2. As shown in FIG. 5, the nut 240 sent from the nut conveying path 23 changes its traveling direction from the substantially horizontal direction d1 to the substantially vertical direction d2 by the regulation parts 36 and 37, and falls and is placed on the lower electrode 42.

When the nut 240 is placed on the lower electrode 42, the feeding head 30 is moved away from the welding part 40 by the driving part 31 as shown in FIG. 1. In this state, the upper electrode 41 gets close to the lower electrode 42, and welding is performed, and the welding nut 240 is welded to a member such as the bracket 230.

(Function and Effect)

Next, effects of the present embodiment will be described. In a conventional device for attaching a component such as a welding nut to a bracket, nuts sent by air from a device that generates vibration are temporarily stored, and are singly transported to electrodes where welding is performed by stroke movement of a rod constituting an air cylinder. However, the rod of the air cylinder has a large external shape. When considering setting up a factory overseas from the viewpoint of cost reduction and the like, it is sometimes impossible to ensure a relatively large space for the factory. For this reason, it is probable that downsizing for the attaching device is required.

For this requirement, the attaching device 100 according to the present embodiment includes a component feeding part 10, a welding part 40, a conveying part 20, and a placement part 30, and the conveying part 20 delivers nuts 240 singly to welding part 40 so that the nut 240 passes through the feeding head 30 and is placed on the electrode 42.

Therefore, it is not necessary to transport the nut to the electrode by the rod of the air cylinder after temporarily storing the nut in front of the air cylinder like conventional manner, and since it is not necessary to provide the rod for transporting the stored nut, the attaching device 100 can accomplish space saving. In addition, since the device is configured to transport nuts singly instead of transporting nuts after storing the nuts in a conventional manner, it is possible to eliminate jamming of the nuts, which may occurs when storing and conveying the nuts.

Further, in the first embodiment, the configuration corresponding to the placement part is constituted by the movable base 32 as well as the nut conveying path 23 which can move to and away from the electrodes 41 and 42 in a direction intersecting the vertical direction in which the electrodes 41 and 42 are aligned. Thus, it is possible to eliminate the use of an air cylinder for temporarily storing the nuts 240 and transporting them to the electrode 42.

In addition, the feeding head 30 is configured to have regulation parts 36 and 37 as a direction changing part for directing the moving direction of the nut 240 sent by air pressure from the nut conveying path 23 extending in a substantially horizontal direction to the electrode 42. Accordingly, it is possible to guide the nut 240 conveyed from the nut conveying path 23 to the vicinity of the electrode 42, and reduce the situation where the nut 240 is not properly set on the electrode 42. Thus, nut joining can be efficiently and quickly achieved.

Further, the feeding head 30 is configured to linearly move between the electrode 41 and the electrode 42 before welding is performed by the electrodes 41 and 42 corresponding to the welding part 40. Therefore, the position at which the nut 240 is released can be located closer to the electrode 42, and accordingly the air pressure necessary for placing the nut 240 on the electrode 42 can be reduced.

In addition, a component manufactured according to the first embodiment can be configured as the bracket 230 that can be joined to the cross member 220 that constitutes the sub-frame 200 of the suspension, as shown in FIG. 7(B) as an example.

(Embodiment 2)

Figure 8:
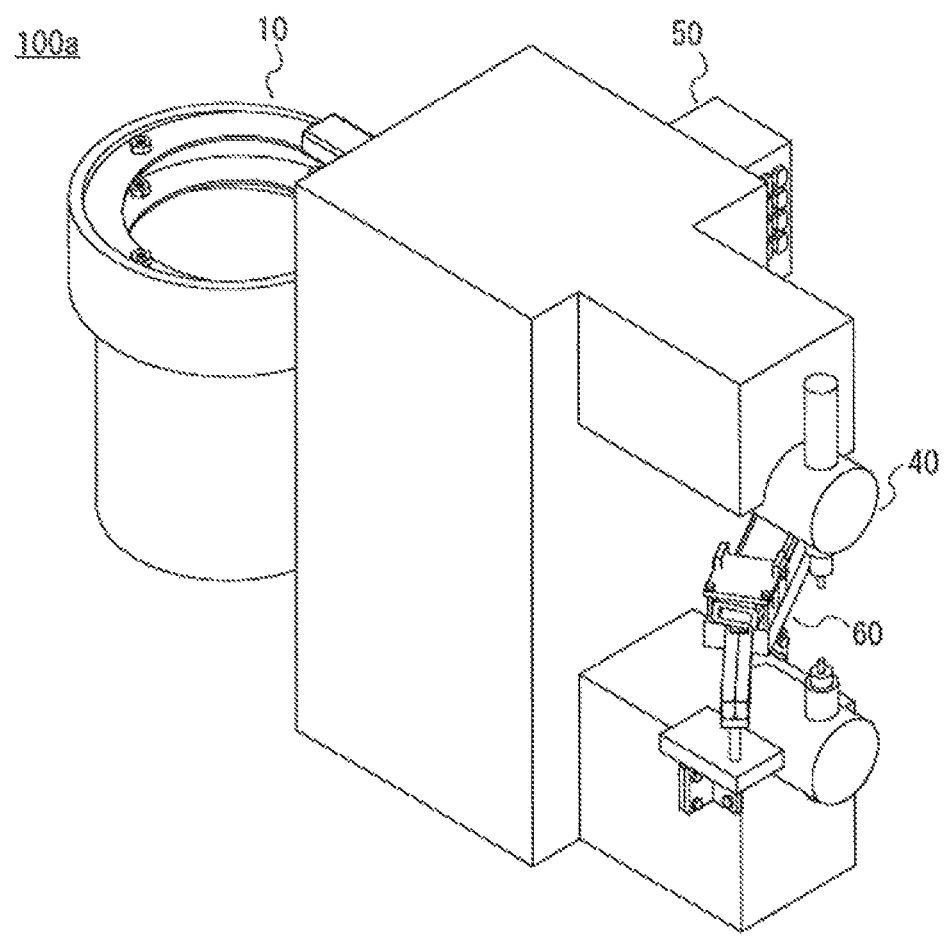
FIG. 8 is a perspective view of an attaching device according to a second embodiment of the present invention.
Figure 9:
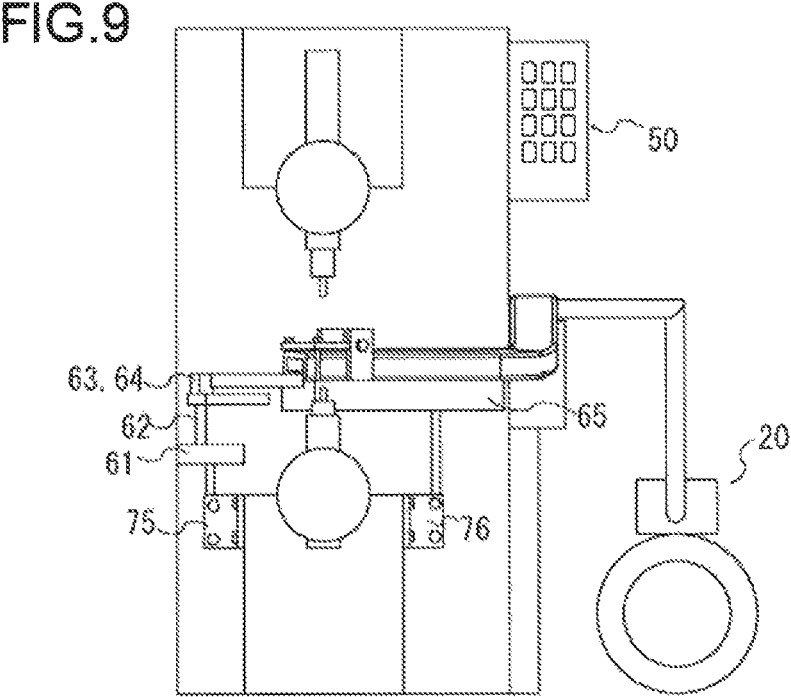
FIG. 9 is a front view of the attaching device.
Figure 10:
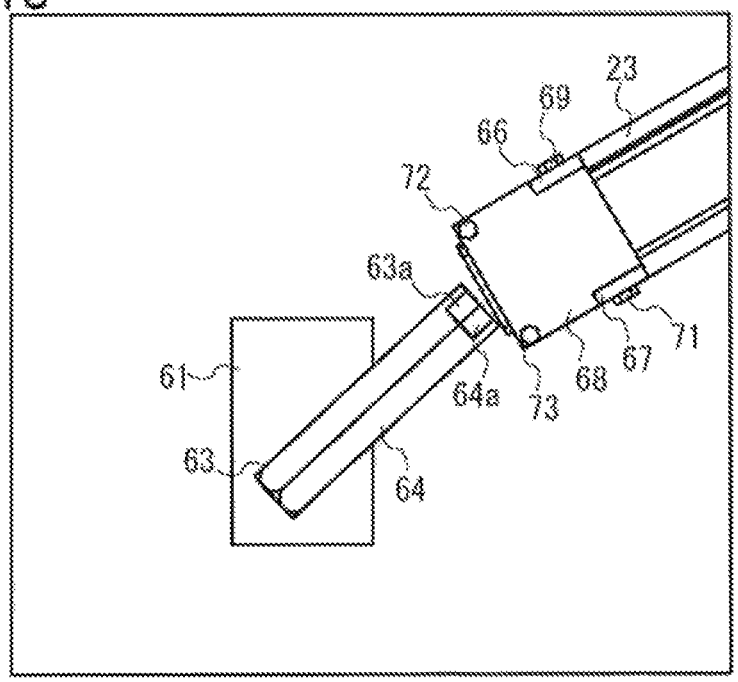
FIG. 10 is an enlarged plan view of a placement part in the attaching device.
Figure 11A:
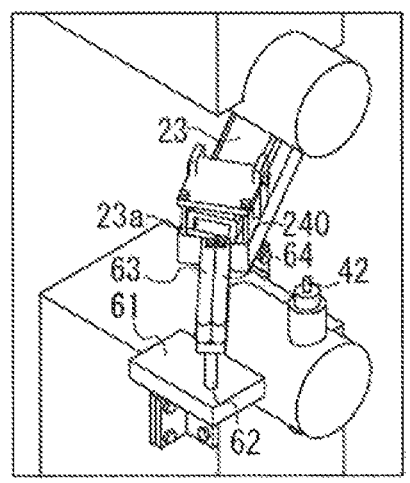
FIGS. 11(A) to 11(C) are perspective views showing, in the attaching device, how a nut is disposed on the lower electrode.
Figure 11B:
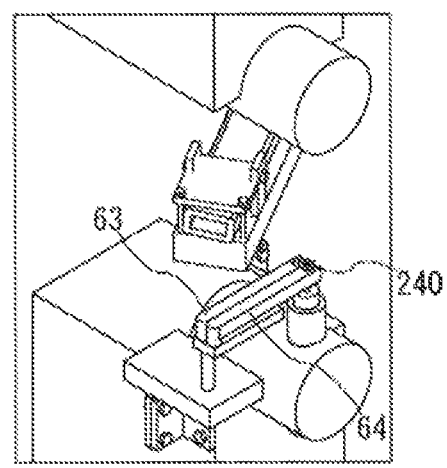
Figure 11C:
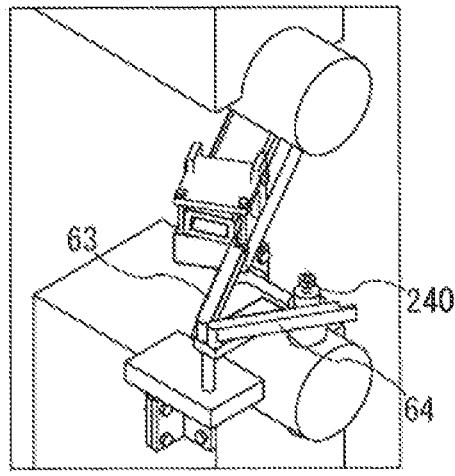

FIGS. 8 to 10 are a perspective view and a front view showing an attaching device according to the second embodiment of the present invention, and an enlarged plan view showing a placement part of the attaching device. FIGS. 11(A) to 11(C) are perspective views showing how the nut is placed on the lower electrode in the attaching device.

The attaching device 100a in the second embodiment includes a component feeding part 10, a conveying part 20, a placement part 60, a welding part 40, and an operation part 50. The same reference numerals are given to the same configurations as those of the first embodiment, and the description thereof will be omitted.

The placement part 60 includes a rotation driving part 61, a rotation shaft 62, holding parts 63 and 64 (corresponding to a rotation holding part), a support base 65, fixing parts 66, 67 and 68, and bolts 69, 71, 72, and 73. The rotation driving part 61 is fixed to a housing of the attaching device 100a with the bracket 75 by bolts, and incorporates structures such as gears and actuators for rotating the rotation shaft 62, the holding parts 63 and 64, and the like.

As shown in FIG. 9, the rotation shaft 62 is rotatably attached to the upper part of the rotation driving part 61, and the holding parts 63 and 64 are attached to the upper part of the rotation shaft 62. As a result, the holding parts 63 and 64 move in the rotation direction as the rotation shaft 62 rotates. The holding parts 63 and 64 have shafts which are rotatable separately from the rotation shaft 62. The holding parts 63 and 64 each have recesses 63a and 64a, and the nut 240 from the nut conveying path 23 can be placed on the recesses 63a and 64a.

The holding parts 63 and 64 are configured so that the holding part 63 and the holding part 64 can move away from each other in the rotation direction by rotating around the respective shafts. As a result, as shown in FIG. 11(A), the holding parts 63 and 64 place the nut 240 sent from the nut conveying path 23 in the recesses 63a and 64a and, as shown in FIG. 11(B), the holding parts 63 and 64 are temporarily positioned between the electrode 41 and the electrode 42 by the rotation shaft 62. Then, as shown in FIG. 11(C), as the holding part 63 and the holding part 64 move away from each other in the rotation direction around the respective rotation shafts, the nut 240 placed on the recesses 63a and 64a is released and placed on the electrode 42.

The support base 65 supports the nut conveying path 23, and the support base 65 is fixed with the bracket 76 by bolts. The fixing part 66, the fixing part 67, the fixing part 68 have the same structure as the fixing part 33, the fixing part 34, and the fixing part 35 in the first embodiment respectively, and thus description thereof is omitted. Since the bolts 69, 71, 72, and 73 have the same configuration as the bolts 38a, 38b, 38c, and 38d of the first embodiment, the description is omitted. The outlet 23a of the nut conveying path 23 is located in the vicinity of the holding parts 63 and 64 of the fixing part 68 in the second embodiment.

Regarding the attachment of the nut by the attaching device 100a of the second embodiment, the feeding of the nut 240 by the conveying part 20 from the component feeding part 10 is performed in the same manner as that in the first embodiment. The nut 240 fed by the air pressure from the conveying part 20 is placed on the recesses 63a and 64a of the holding parts 63 and 64 on the welding part 40 side of the nut conveying path 23. As with the above description, the rotation shaft 62 rotates so that the holding parts 63 and 64 are positioned between the electrode 41 and the electrode 42, and the holding part 63 and the holding part 64 move away from each other so that the nut 240 is placed on the electrode 42. As with the first embodiment, the holding parts 63 and 64 are retracted from the welding part 40, and the nut 240 is welded to a member such as the bracket 230 by the electrodes 41 and 42.

According to the second embodiment, the placement part 60 is provided with the rotation shaft 62, and is configured to move to the outlet 23a of the nut conveying path 23 and move between the pair of electrodes 41 and 42 by rotation around the rotation shaft 62. Thus, it is not necessary to lengthen the nut conveying path 23 such that the nut conveying path 23 can move closer to a position between the electrodes 41 and 42 from a state where long nut conveying path 23 is evacuated from the electrodes 41 and 42. This configuration contributes to space saving.

Further, the placement part 60 has a pair of holding parts 63 and 64 which hold the nut 240 until the nut is transported to the lower electrode 42, and the pair of holding parts 63 and 64 rotates around the rotation shaft 62, and moves closer to each other at the outlet 23a of the nut conveying path 23 so as to hold the nut 240 coming out of the outlet 23a, and then moves away from each other around the rotation shaft 62 at a position between the pair of electrodes 41 and 42 such that the nut 240 is placed on the lower electrode 42. Thus, this configuration can prevent the size of the nut conveying path 23 from becoming larger and contribute to space saving as with the above description.

The present invention is not limited to the above embodiments, and various modifications are possible within the scope of the claims.

In the above description, the embodiment is described in which a fluid for conveying the nut is air. However the present invention is not limited thereto, and the fluid may be constituted by other fluid such as nitrogen.

REFERENCE SIGNS LIST

10 Component feeding part (storage part)
100, 100a Attaching device
20 Conveying part
23 Nut conveying path (long member)
30 Feeding head (placement part)
32 Movable base (moving part)
36, 37 Regulation part (direction changing part)
40 Welding part
60 Placement part
63,64 Holding part (rotation holding part)
200 Sub-frame of suspension
210 Cross member
220 Side member
230 Bracket
240 Welding nut

The invention claimed is:

1. An attaching device for attaching a nut to a counterpart component, comprising:
    a storage part storing a plurality of the nuts;
    a welding part welding the nut to the counterpart component by a pair of electrodes;
    a conveying part having a flexible long member for conveying the nut stored in the storage part singly to the welding part; and
    a placement part provided at an outlet of the long member on a side of the welding part, and temporarily getting close between the pair of electrodes of the welding part to place the nut
    wherein the placement part has a moving part,
    the moving part together with the outlet is capable of moving to and away from the pair of electrodes in a direction crossing a direction in which the pair of electrodes is aligned,
    the moving part together with the outlet being configured to get close between the pair of electrodes of the welding part until the nut is sent out from a delivery portion provided at the storage part, and
    with the moving part being configured such that when the moving part is close between the pair of electrodes, the nut sent out from the delivery portion is placed on a lower electrode of the pair of electrodes after passing through the placement part singly from the conveying part.

2. The attaching device according to claim 1,
    wherein the long member extends in a direction intersecting a direction in which the pair of electrodes is aligned,
    the moving part is connected to the outlet, and
    the placement part has a direction changing part which is connected to the moving part and directs a traveling direction of the nut coming out of the outlet of the long member to the lower electrode.

3. The attaching device according to claim 1, wherein the counterpart component is attached to a sub-frame of a suspension.

* * * * *